United States Patent
Kim et al.

(10) Patent No.: US 7,338,556 B2
(45) Date of Patent: Mar. 4, 2008

(54) APPARATUS AND METHOD FOR FABRICATING A LIQUID CRYSTAL DISPLAY

(75) Inventors: Yong Bum Kim, Seoul (KR); Sung Hoe Yoon, Kyounggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/266,756

(22) Filed: Oct. 9, 2002

(65) Prior Publication Data

US 2003/0210311 A1    Nov. 13, 2003

(30) Foreign Application Priority Data

May 9, 2002    (KR) .................... 10-2002-0025557

(51) Int. Cl.
*B05B 15/00*    (2006.01)
(52) U.S. Cl. ...................... 118/300; 118/641
(58) Field of Classification Search ............. 118/641, 118/300; 347/1, 102; 427/162, 163.1, 163.3, 427/164, 165
See application file for complete search history.

(56) References Cited

U.S. PATENT DOCUMENTS 5,059,266 A * 10/1991 Yamane et al. ............. 156/64
5,132,248 A * 7/1992 Drummond et al. ........ 505/325
2003/0112307 A1* 6/2003 Maeda et al. .............. 347/102

FOREIGN PATENT DOCUMENTS

GB       2350321    * 11/2000
JP       2-283452   * 11/1990

* cited by examiner

*Primary Examiner*—Brenda A. Lamb
(74) *Attorney, Agent, or Firm*—Morgan, Lewis & Bockius LLP

(57) ABSTRACT

An apparatus for fabricating a liquid crystal display includes a vessel for containing a material for a spacer, an ink-jet head for jetting the material onto a plate and a light source for pre-curing the material by radiating light onto the material as the material is jetted from the ink-jet head. A method for fabricating a liquid crystal display includes the steps of aligning an ink-jet device relative to at least one of an upper plate and a lower plate, jetting a material for a spacer from the ink-jet device and pre-curing the material by irradiating the material with light while the material is jetted from the ink-system before the material impacts upon the at least one of the upper plate and a lower plate.

4 Claims, 6 Drawing Sheets

APPARATUS AND METHOD FOR FABRICATING A LIQUID CRYSTAL DISPLAY

The present invention claims the benefit of Korean Application No. P2002-25557 filed in the Republic of Korea on May 9, 2002, which is hereby incorporated by reference in its entirety.

BACKGROUND OF THE INVENTION

1. Field of the Invention

This invention relates to a liquid crystal display, and more particularly to an apparatus and method for fabricating a liquid crystal display wherein a spacer is positioned for the purpose of keeping a cell gap.

2. Description of the Related Art

Generally, a liquid crystal display (LCD) controls the light transmittance of each liquid crystal cell in response to a video signal. Accordingly, a picture is displayed corresponding to the video signals on an LCD panel having liquid crystal cells arranged in a matrix. To this end, the LCD panel includes an active area having liquid crystal cells arranged in a matrix and driving circuits for driving the liquid crystal cells in the active area.

Referring to FIG. 1, a conventional LCD includes an upper plate consisting of a black matrix 20, a color filter 16, a common electrode 14 and an upper alignment film 12 that are sequentially provided on the upper substrate 11. The conventional LCD also includes a lower plate consisting of a lower substrate 1 on which a thin film transistor (TFT) 25/6/26/27/28/30, a pixel electrode 22 and a lower alignment film 10 are sequentially provided. In addition, the conventional LCD includes a spacer 24 and a liquid crystal (not shown) provided between the upper plate and the lower plate.

In the lower plate, the TFT includes a gate electrode 25 connected to a gate line (not shown), a source electrode 28 connected to a data line (not shown), and a drain electrode 30 connected, via a contact hole 23, to the pixel electrode 22. Further, the TFT includes a gate insulating film 6 for insulating the gate electrode 25, and an active semiconductor layer 26 on the gate insulating film for creating a conductive channel between the source electrode 28 and the drain electrode 30 when a gate voltage is applied to the gate electrode 25. As shown in FIG. 1, ohmic semiconductor layers 27 are provided respectively between the active layer 26 and the source/drain electrodes 28 and 30 and doped with an impurity for an ohmic contact between the active semiconductor layer 26 to the source electrode 28 and between the active semiconductor layer 26 to the drain electrode 30.

When a gate signal is applied to the gate line of the TFT, a data signal from a data line can be switched through the TFT to the pixel electrode 22. As a result, the liquid crystal is rotated by means of a voltage difference between a data signal applied to the pixel electrode 22 via the TFT and a common voltage Vcom applied to a common electrode 14. Accordingly, light transmission quantity through the liquid crystal is determined by the arrangement of the liquid crystal.

The pixel electrode 22 is positioned at an area adjacent to the intersection of a data line and a gate line, and is made from a transparent conductive material having a high light transmittance. The pixel electrode 22 is provided on a protective film 8 that is on the surface of the lower substrate 1, and is electrically connected, via a contact hole 23 in the protective film 8, to the drain electrode 30. An upper portion of the lower substrate 1, provided with the pixel electrode 22, is coated with an alignment film 10 that is subjected to a rubbing process, which completes the assembly of the lower plate.

The black matrix 20 of the upper plate is formed on the upper substrate 11 in correspondence with the TFT area of the lower plate and an area adjacent to the intersection of a gate line and a data line. The black matrix 20 also defines a liquid crystal cell area in which a color filter 16 will be formed. Further, the black matrix 20 plays a role in preventing light leakage and absorbing an external light such that contrast can be enhanced. The color filter 16 is formed in the cell area as defined by the black matrix 20. The color filter 16 specifically transmits a wavelength of light for a certain color, such as red, green or blue colors. The common electrode 14 formed on the color filter 16. The alignment film 12 is formed by coating an alignment material, such as polyimide, on the common electrode 14 and then the rubbing process is carried out.

Ball spacers, like ball spacer 24, are sprinkled onto either one of the upper plate or the lower plate of an LCD panel by means of a jet nozzle to define a gap between the upper plate and the lower plate. The ball spacers should be uniformly distributed for the purpose of keeping a uniform cell gap of the LCD panel. However, it is difficult to uniformly distribute ball spacers due to the randomness in any sprinkling system. If the ball spacers are not uniformly distributed in the LCD panel, the cell gap in individual liquid crystal cells may not be uniform such that a stain-like appearance phenomenon is created in one or more areas on the LCD panel. In addition, if a user applies a pressure to the screen at the exterior of the LCD panel when ball spacers are used, a ripple phenomenon can occur in which the picture on the LCD panel has darkened areas shaped like waves. The darkened wave-shaped areas occur because the ball spacers have been shifted around between the upper plate and the lower plate.

Recently, there has been a study to provide a spacer that is fixed and patterned at a specific location to overcome the disadvantages of the ball spacer 24 and its sprinkling system. Hereinafter, a manufacturing method of the pattern spacer will be described with reference to FIG. 2A to FIG. 2C and FIG. 3. More particularly, FIG. 2A to FIG. 2C are cross-sectional views showing a process of manufacturing a conventional pattern spacer, which will be described in conjunction with FIG. 3, which is a flow chart.

A spacer material 42a, as shown in FIG. 2A is coated onto a substrate 40, as referred to in step S31 of FIG. 3. The substrate 40 can be either one of the upper plate provided or the lower plate provided with the TFT. The spacer material 42a is a material that is mixed with a solvent, a binder, a monomer and a photo-initiator. As referred to in step S32 of FIG. 3, the spacer material 42a is subject to a pre-baking to eliminate a solvent within the spacer material 42a, thereby making the spacer material 42a into a paste-like state.

Subsequently, as shown in FIG. 2B, a photo mask 44 having a transmission part 44a and a shielding part 44b is aligned on the spacer material 42a. As referred to in step S33 of FIG. 3, when an ultraviolet (UV) ray is irradiated onto the spacer material 42a through the photo mask 44, the spacer material corresponding to the transmission part 44a is exposed to the ultraviolet ray.

As shown in FIG. 2C and referred to in step S34 of FIG. 3, the spacer material 42a is patterned. When the spacer material 42a is developed using a negative process, the spacer material 42a that is not exposed to the ultraviolet ray is removed while the spacer material that is exposed to the ultraviolet ray is left. When the spacer material 42a is developed using a positive process, the spacer material 42a that is exposed to the ultraviolet ray is removed while the spacer material that is not exposed to the ultraviolet ray is left. As referred to in step S35 of FIG. 3, the spacer material 42a patterned in this manner is cured to form a spacer 42 having a desired height.

The spacer 42 for keeping a cell gap in the LCD panel can occupy about 20% of the entire area in a liquid crystal cell. If the spacer 42 is formed by the above-mentioned photolithography technique, then more than 95% of the coated spacer material 42a is wasted as a result of a spin-coating process of the photolithographic material. Thus, the conventional photolithography wastes a lot of material in forming the spacer 42 and is inconvenient in that it requires a complex five-step process.

To reduce the waste of material and the number of process step, there has been a spacer formation method suggested using an ink-jet device as shown in FIG. 4A to FIG. 4C. As shown in FIG. 4A, an ink-jet device 50 corresponding to a formation position of the spacer 58 is aligned. In this alignment state, ink from the ink-jet device 50 is jetted to the substrate 40. The substrate 40 corresponds to at least one of the upper and lower plates of a LCD panel. The ink-jet device 50 jets ink using a thermal system or a piezoelectric system. Typically, the latter system is used. The ink-jet device 50 using the piezoelectric system consists of a vessel 52 for containing a material to be jetted, and an ink-jet head 54 for jetting a material from the vessel 52.

The vessel 52 is filled with the spacer material 58, and the ink-jet head 54 is provided with a piezoelectric device and a nozzle 56 for jetting the spacer material 58 from the vessel 52. When a voltage is applied to the piezoelectric device, a physical pressure is generated to cause a capillary phenomenon in which a flow path between the vessel 52 and the nozzle 56 repeatedly contracts and relaxes. Due to this capillary phenomenon, the spacer material 58 jets out of the nozzle 56 onto the substrate 40, as shown in FIG. 4B. Then, a curing process is used that exposes the spacer material 58 on the substrate 40 to an ultraviolet ray from a light source 60, as shown in FIG. 4C. Thus, the spacer 58 material can be hardened with a width W and a height H, as shown in FIG. 4C.

However, the spacer 58 material is affected by gravity while falling onto the substrate 40, as well as, by being jetted from the ink-jet device 50. Thus, the spacer material has a wide spread on the substrate 40 when forming a spacer 59 of at least a minimum height for keeping the cell gaps between the upper plate and the lower plate of the LCD panel. Accordingly, it is only possible to obtain a spacer 59 of a certain height corresponding to the maximum width of the spacer 59 on the substrate. If the height of the spacer for keeping a minimum cell gap is not obtained, then brightness and contrast are reduced causing a deterioration of picture quality. If the width of the spacer is too wide for a black matrix area of the upper plate or a TFT area of the lower plate, then aperture area of the LCD panel is reduced.

SUMMARY OF THE INVENTION

Accordingly, the present invention is directed to an apparatus and method for fabricating a liquid crystal display that substantially obviates on or more of the problems due to limitations and disadvantages of the related art.

An object of the present invention is to provide an apparatus and method for fabricating a liquid crystal display wherein a spacer is positioned for the purpose of keeping a cell gap.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, an embodiment of the invention is an apparatus for fabricating a liquid crystal display including a vessel for containing a material for a spacer, an ink-jet head for jetting the material onto a plate and a light source for pre-curing the material by radiating light onto the material as the material is jetted from the ink-jet head.

In another embodiment of the invention, a method for fabricating a liquid crystal display includes the steps of aligning an ink-jet device relative to at least one of an upper plate and a lower plate, jetting a material for a spacer from the ink-jet device and pre-curing the material by irradiating the material with light while the material is jetted from the ink-jet system before the material impacts upon the at least one of the upper plate and a lower plate.

It is to be understood that both the foregoing general description and the following detailed description are exemplary and intended to provide further explanation of the invention as claimed.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principles of the invention. These and other objects of the invention will be apparent from the following detailed description of the embodiments of the present invention with reference to the following drawings.

DETAILED DESCRIPTION OF THE PREFERRED EMBODIMENTS

Figure 5A:
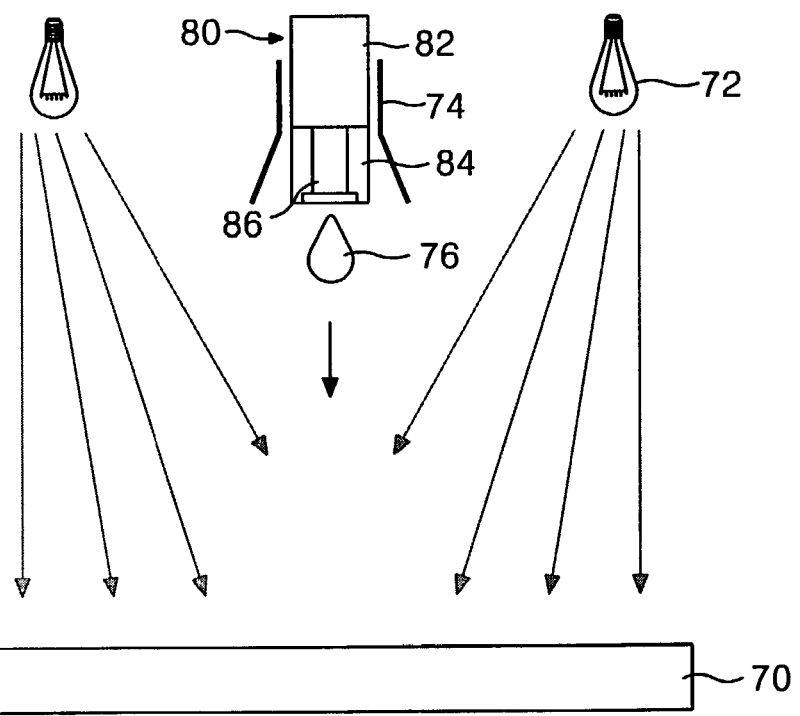
FIGS. 5A to 5C depict a method of fabricating a liquid crystal display employing an ink-jet system according to an embodiment of the present invention.
Figure 5B:
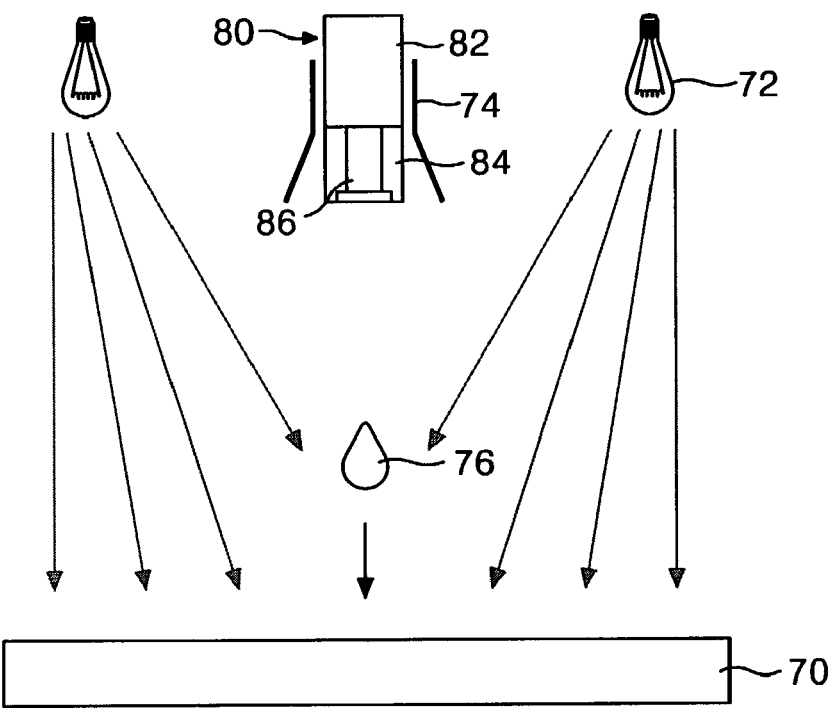
Figure 5C:
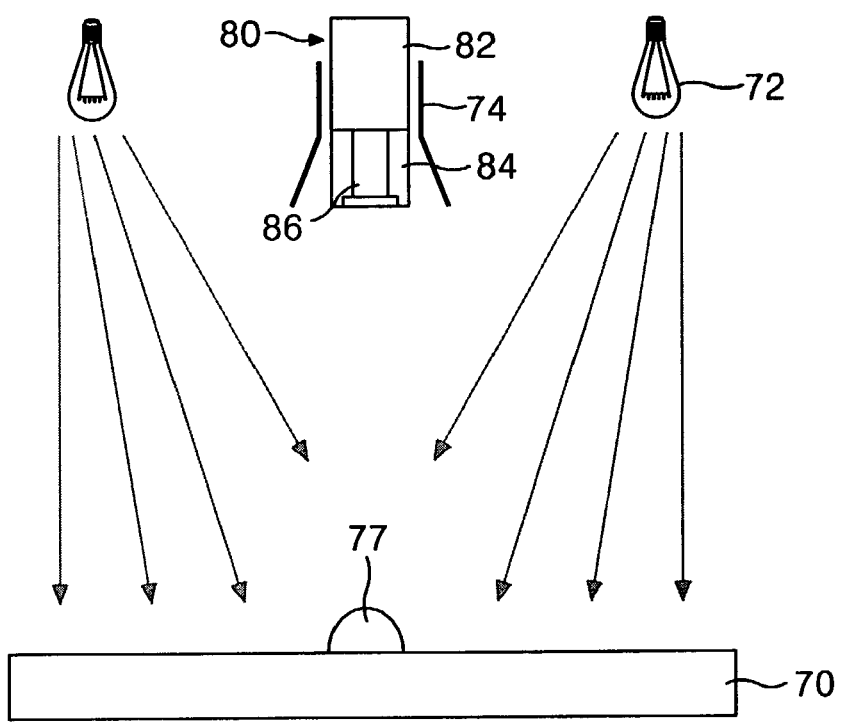

Referring to FIGS. 5A to 5C, in a liquid crystal display according to an embodiment of the present invention, a spacer 76 undergoes curing while being dropped or jetted from an ink-jet 80. For example, the spacer 76 is jetted onto a substrate 70 using an ink-jet device 80 and, at the same time, light irradiates the spacer 76. The substrate 70 can be one of an upper plate and a lower plate of a liquid crystal display panel. On the upper plate, a black matrix, a color filter, a common electrode and an upper alignment film are sequentially provided on an upper substrate. On the lower plate, a TFT, a pixel electrode and a lower alignment film are sequentially provided on a lower substrate.

The ink-jet device 80 consists of a vessel 82 for containing the material for the spacer 76 to be jetted, and an ink-jet head 84 for jetting the material for the spacer 76 from the vessel 82 out of the ink-jet head. When a voltage is applied to the piezoelectric device within the ink-jet head 84, physical pressure is generated that causes a capillary phenomenon in which a flow path between the vessel 82 and the nozzle 86 repeatedly contracts and relaxes. Due to this capillary phenomenon, the material for the spacer 76 is jetted through the nozzle 86.

To form the spacer 76, the ink-jet device 80 is aligned in correspondence with a formation position for the spacer 76. Then, when a driving voltage is applied to the ink-jet device 80, the material for the spacer 76 is jetted onto the substrate 70. The material for the spacer 76 is exposed to an ultraviolet ray generated from a light source 72 while being dropped onto the substrate 70. The material for the spacer 76 is jetted from the ink-jet device 80 in a paste-like state having a low viscosity, and is pre-cured by the irradiation of ultraviolet rays from the light source 72 during the jetting upon the substrate 70. Thus, when the material for the spacer 76 impacts upon on the substrate 70, the viscosity of the material for the spacer 76 has been increased by the ultraviolet rays such that a contact angle θ of the material for the spacer 76 is enlarged.

The contact angle θ is an angle that is made by the surface of the material for the spacer 76 with respect to the surface of the substrate 70 at the surface of the substrate 70. If the contact angle θ is small, then the height of the material for the spacer 76 is lower and the material for the spacer 76 will have a wider width. On the other hand, if the contact angle θ is large, then the height of the material for the spacer 76 is higher and has less width than a material for the spacer with a lower contact angle. Since the material for the spacer 76 according to the present invention has a larger contact angle θ than the conventional art, the height of the material for the spacer 76 can be higher relative to width of the spacer 76, as compared to a conventional spacer.

Figure 1:
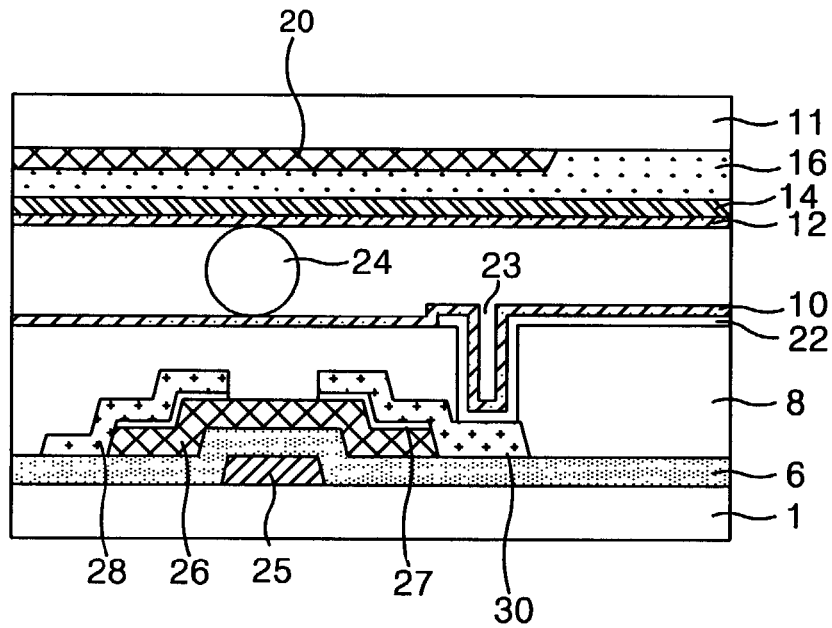
FIG. 1 is a cross-sectional view showing a structure of a conventional liquid crystal display.
Figure 2A:
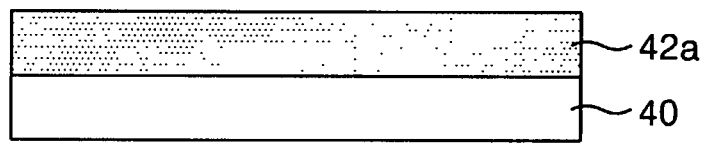
FIGS. 2A to 2C are section views representing a process of manufacturing a conventional pattern spacer.
Figure 2B:
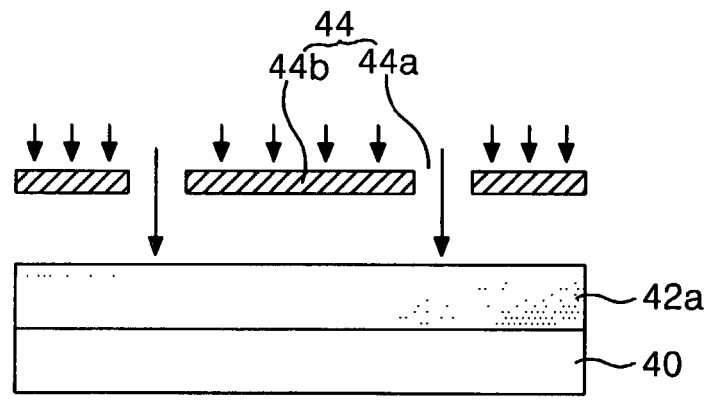
Figure 2C:
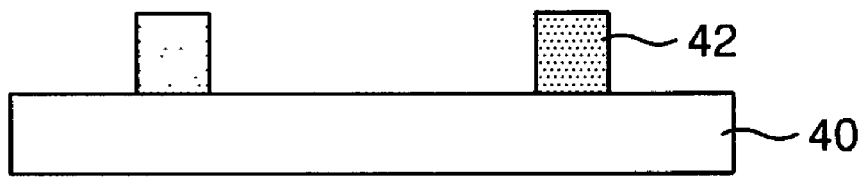
Figure 3:
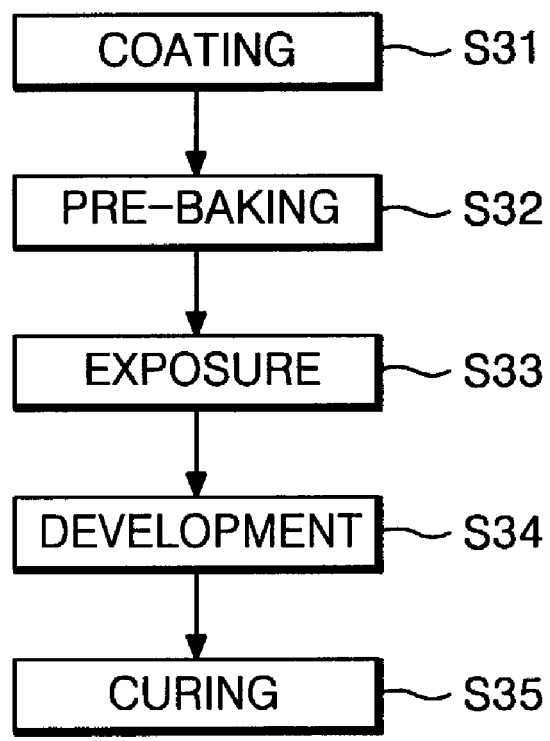
FIG. 3 is a flow chart representing the spacer manufacturing method shown in FIG. 2.
Figure 4A:
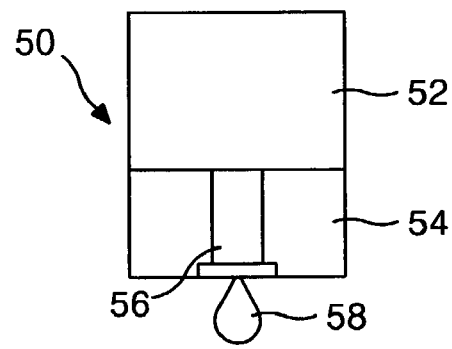
FIGS. 4A to 4C depict the conventional spacer manufacturing method employing an ink-jet system.
Figure 4A:
Figure 4B:
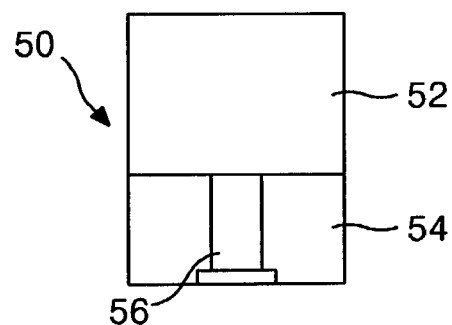
Figure 4B:
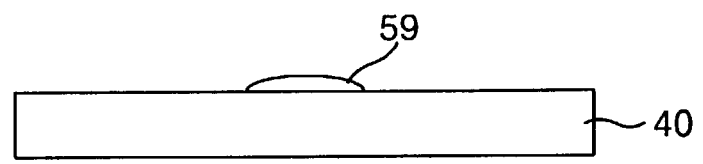
Figure 4C:
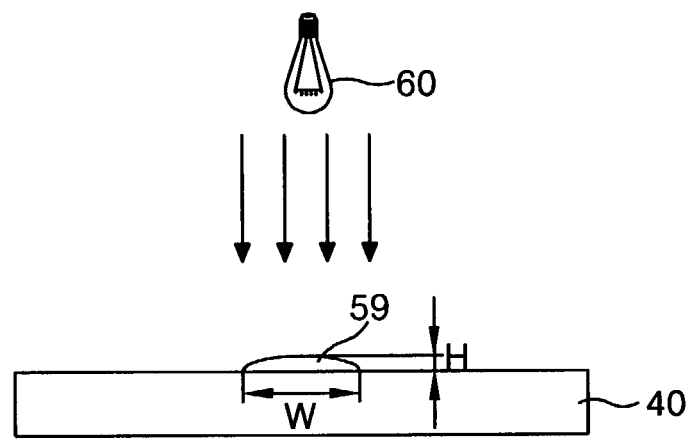
Figure 6:
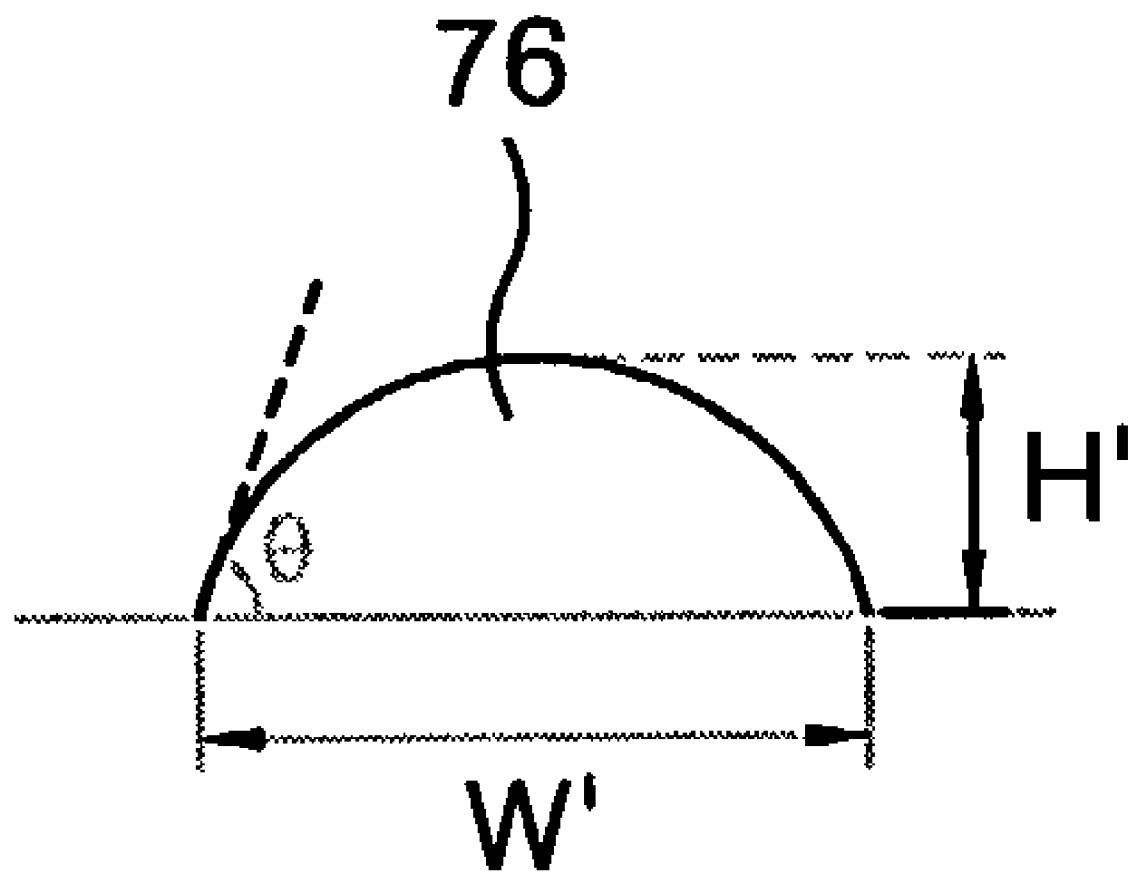
FIG. 6 represents a contact angle of the spacer shown in FIG. 5C.

Subsequently, the material for the spacer 76 is cured by additional ultraviolet rays from the light source 72 as shown in FIG. 5C. Thus, as shown in FIG. 6, the spacer 77 according to the present invention has a narrower width W' and a higher height H' than the conventional art shown in FIG. 4C. In other words, the spacer 77 is not spread as wide, but has a larger height, in comparison to the conventional spacer.

However, if the nozzle 86 of the ink-jet device 80 is exposed to the ultraviolet rays, then a clogging phenomenon occurs in which the material for spacer 76 is hardened in the end portion of the nozzle 86 where the material jets out. The hardening of the material in the end portion of the nozzle 86 can prevent jetting or cause inaccurate jetting, such as a spray, of the material for the spacer 76. To prevent the clogging phenomenon, a protective cap 74 can be installed around the nozzle 86 of the ink-jet device 80 to block ultraviolet rays from the light source 72 from irradiating the nozzle 86.

In the exemplary illustrations of FIGS. 5A to 5C, two light sources 72 are provided such that a first light source 72 is on one side of the ink-jet head 84 and a second light source is on another side of the ink-jet head 84 so that the material for the spacer 76 being jetted from the ink-jet device 80 is symmetrically exposed by the irradiation of ultraviolet rays from the light sources 72. Moreover, the nozzle 86 of the ink-jet head 84 is positioned at a first distance from the substrate 70, and the light sources 72 are positioned at a second distance from the substrate 70 such that the first distance is less than the second distance, thereby further preventing the clogging phenomenon by minimizing exposure of the nozzle 86 of the ink-jet device 80 to ultraviolet rays from the light sources 72.

As described above, the spacer 77 is formed on a substrate 70 that is either the upper plate or the lower plate of an LCD device using an ink-jet device 80. On the lower plate, the spacer 77 is formed on an area of the lower substrate corresponding to the gate lines, thin film transistor or the data lines, or in area of the lower substrate that will correspond with the black matrix of the upper plate. In other words, the spacer 77 does not have to be formed on the pixel electrode of the lower plate. On the upper plate, the spacer 77 is formed on an area of the upper substrate corresponding to the black matrix. Thereafter the upper plate and the lower plate are positioned and joined with each other. In an alternative, spacers can be formed on both the upper plate or the lower plate of an LCD device using an ink-jet device 80 prior to positioning and joining them with each other. After the upper and lower plates are joined, a liquid crystal is injected between the upper plate and the lower plate, thereby completing the LCD.

As described above, according to the present invention, an ultraviolet light irradiates a material for a spacer while the material for the spacer is being jetted onto a substrate. Thus, the material for the spacer is exposed to an ultraviolet rays while being jetted, such that the viscosity of the material for the spacer is increased to obtain a desired spacer height after the material for the spacer impacts upon the substrate. Accordingly, a spacer results having a narrower width and a larger height than spacers in the conventional art, so that a suitable cell gap height can be achieved while maintaining an appropriate spacer width. Thus, brightness and contrast can be increased to improve a picture quality. Further, according to the present invention, the jetting process for the spacer is carried out simultaneously with the curing process, so that the processing time required for the curing and jetting processes is shortened in comparison to the conventional photolithography technique.

It will be apparent to those skilled in the art that various modifications and variations can be made in the apparatus and method for fabricating a liquid crystal display of the present invention without departing from the spirit or scope of the invention. Thus, it is intended that the present invention cover the modifications and variations of this invention provided they come within the scope of the appended claims and their equivalents.

What is claimed is:

1. An apparatus for fabricating a liquid crystal display, comprising:
   a vessel for containing a material for a spacer;
   an ink-jet head for jetting the material onto a plate of the liquid crystal display; and
   a light source for pre-curing the material by radiating light onto the material while the material is jetted from the ink-jet head, the light source including a first light emitter on one side of the ink-jet head and a second light emitter on another side of the ink-jet head,
   wherein light radiation ranges of the first light emitter and the second light emitter are overlapped with each other so that the first and second light emitters simultaneously radiate light onto same drops of the material from two respective different directions to procure the material prior to the material impacting upon the plate in order that a viscosity of the material increases.

2. The apparatus for fabricating a liquid crystal display as claimed in claim 1, wherein the ink-jet head includes a nozzle positioned at a first distance from the plate for jetting the material from the vessel onto the plate.

3. The apparatus for fabricating a liquid crystal display as claimed in claim 2, further comprising:

a protective cap provided on an end portion of the nozzle where the material jets out of the nozzle such that the end portion of the nozzle is shielded from said light source, the light source being at a second distance from the plate.

4. The apparatus for fabricating a liquid crystal display as claimed in claim 3, wherein the first distance between the plate and the nozzle is less than the second distance between the light source and the plate.

* * * * *